United States Patent
Shimazaki et al.

(10) Patent No.: US 9,244,643 B2
(45) Date of Patent: Jan. 26, 2016

(54) PRINTING APPARATUS AND METHOD FOR CONTROLLING THE SAME

(75) Inventors: Atsushi Shimazaki, Yokohama (JP); Shigeru Mizoguchi, Kawasaki (JP); Kazuyuki Masumoto, Yokohama (JP); Michihei Murayama, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1822 days.

(21) Appl. No.: 12/138,282

(22) Filed: Jun. 12, 2008

(65) Prior Publication Data

US 2008/0309974 A1    Dec. 18, 2008

(30) Foreign Application Priority Data

Jun. 13, 2007  (JP) ................................ 2007-156393

(51) Int. Cl.
*G06F 3/12* (2006.01)
*G06F 13/00* (2006.01)

(52) U.S. Cl.
CPC ............ *G06F 3/1259* (2013.01); *G06F 3/1207* (2013.01); *G06F 3/1208* (2013.01); *G06F 3/1219* (2013.01); *G06F 3/1258* (2013.01)

(58) Field of Classification Search
CPC ..... G06K 15/00; G06F 3/1297; G06F 3/1296; G06F 21/608; H04N 1/0024; H04N 2201/0082
See application file for complete search history.

(56) References Cited

U.S. PATENT DOCUMENTS

| | | | | |
|---|---|---|---|---|
| 7,002,707 | B2 * | 2/2006 | Kujirai | G06F 21/608 235/375 |
| 2003/0016376 | A1 * | 1/2003 | Narushima | H04N 1/00132 358/1.13 |
| 2006/0164674 | A1 * | 7/2006 | Someno | 358/1.14 |
| 2006/0218272 | A1 * | 9/2006 | Murakami | G06F 3/1204 709/224 |
| 2006/0232800 | A1 * | 10/2006 | Otake | H04N 1/40062 358/1.9 |
| 2007/0206209 | A1 * | 9/2007 | Mount | G07G 5/00 358/1.13 |

FOREIGN PATENT DOCUMENTS

| | | |
|---|---|---|
| JP | 10-304007 A | 11/1999 |
| JP | 2002-036668 A | 2/2002 |
| JP | 2006-279846 A | 10/2006 |

* cited by examiner

*Primary Examiner* — Barbara Reinier
*Assistant Examiner* — Pawandeep Dhingra
(74) *Attorney, Agent, or Firm* — Canon USA, Inc. IP Division

(57) ABSTRACT

There is provided a printing apparatus that can prevent a user from forgetting to set print settings and that can markedly reduce the number of unnecessary prints caused by unsuitable print settings, for example, in a case in which print data such as image data is sent from an image-supplying apparatus to the printing apparatus and in which the printing apparatus prints the print data. The printing apparatus, which receives print data from an image-supplying apparatus and prints the print data, need not start printing image data immediately after the image data is received. An input of print settings is accepted in the printing apparatus, and the image data is printed using the printing settings that have been input.

21 Claims, 8 Drawing Sheets

FIG. 5

| RECEIVED DATA: | IMAGE |
| FILE NAME: | Sample.jpg |

CURRENT PRINT SETTINGS FOR PHOTOGRAPH

SHEET TYPE: ◀ PHOTO PAPER ▶

SHEET SIZE: ◀ L ▶

IMAGE CORRECTION: ◀ YES ▶

MARGIN: ◀ NO MARGIN ▶

[ OK ]  [ CANCEL ]

FIG. 6

| RECEIVED DATA: | IMAGE |
| FILE NAME: | Sample.vcf |

CURRENT PRINT SETTINGS FOR CARD

SHEET TYPE: ◀ PLAIN PAPER ▶

SHEET SIZE: ◀ A4 ▶

FONT: ◀ 12pt ▶

[ OK ]  [ CANCEL ]

FIG. 7

| I/F | PROTOCOL | | DEFINITION OF FUNCTION OF SENDING PRINT SETTINGS | SUSPENSION OF PRINTING WHEN PRINT SETTINGS ARE NOT RECEIVED | SUSPENSION OF PRINTING WHEN PRINT SETTINGS ARE RECEIVED |
|---|---|---|---|---|---|
| IrDA | OBEX | | NO | YES | |
|  | OTHERS | | | NO | NO |
| Bluetooth | GOEP | | NO | YES | |
|  | BIP | IMAGE PUSH | NO | YES | |
|  |  | ADVANCED IMAGE PRINTING FEATURE | YES | YES | NO |
|  |  | OTHERS | | YES | NO |
|  | BPP | SIMPLE PUSH | NO | YES | |
|  |  | JOB BASED TRANSFER MODEL | YES | YES | NO |
|  |  | OTHERS | | YES | NO |
|  | OTHERS | | | NO | NO |
| USB HOST | PTP | PictBridge | YES | YES | NO |
|  | OTHERS | | | NO | NO |

FIG. 8

EXAMPLE 1 OF PRINT SETTINGS USING JOB-BASED TRANSFER MODEL OF BPP

```
CONTENT-LENGTH: bytes in body
CONTENT-LANGUAGE: en-US
CONTENT-TYPE: text/xml; charset = "utf-8"
SOAPACTION: "urn: schemas-bluetooth-org: service: Printer: 1#CreateJob"

<s: Envelope
   xmlns: s = "http://schemas.xmlsoap.org/soap/envelope/"
   s: encodingStyle = "http://schemas.xmlsoap.org/soap/encoding/">
<s: Body>
    <u: CreateJob xmlns: u = "urn: schemas-bluetooth-
    org: service: Printer: 1">
        <JobName>TestJob</JobName>
        <JobOriginatingUserName>TestUser<JobOriginatingUserName>
        <DocumentFormat>application/vnd.pwg-xhtml-print+xml: 1.0
        </DocumentFormat>
        <Copies>1</Copies>
        <Sides>one-sided</Sides>
        <NumberUp>1</NumberUp>
        <OrientationRequested>portrait</OrientationRequested>
        <MediaSize>iso_a4_210x297mm</MediaSize>
        <MediaType>stationery</MediaType>
        <PrintQuality>normal</PrintQuality>
        <CancelOnLostLink>true</CancelOnLostLink>
    </u: CreateJob>
</s: Body>
</s: Envelope>
```

FIG. 9

EXAMPLE 2 OF PRINT SETTINGS USING JOB-BASED TRANSFER MODEL OF BPP

```
CONTENT-LENGTH: bytes in body
CONTENT-LANGUAGE: en-US
CONTENT-TYPE: text/xml; charset = "utf-8"
SOAPACTION: "urn: schemas-bluetooth-org: service: Printer: 1#CreateJob"

<s: Envelope
  xmlns: s = "http://schemas.xmlsoap.org/soap/envelope/"
  s: encodingStyle = "http://schemas.xmlsoap.org/soap/encoding/">
<s: Body>
    <u: CreateJob xmlns: u = "urn: schemas-bluetooth-
    org: service: Printer: 1">
        <JobName>TestJob</JobName>
        <JobOriginatingUserName>TestUser<JobOriginatingUserName>
        <DocumentFormat>application/vnd.pwg-xhtml-print+xml: 1.0
        </DocumentFormat>
    </u: CreateJob>
</s: Body>
</s: Envelope>
```

PRINTING APPARATUS AND METHOD FOR CONTROLLING THE SAME

BACKGROUND OF THE INVENTION

1. Field of the Invention

The present invention relates to a printing apparatus capable of receiving image data from an image-supplying apparatus using a plurality of communication protocols.

2. Description of the Related Art

Recently, sending of images from various types of image-supplying apparatuses, such as mobile phones and digital cameras, directly to printing apparatuses and printing of the images have been implemented. As communication protocols used to print the images, a picture transfer protocol (PTP) of a universal serial bus (USB) interface (I/F), an object exchange (OBEX) protocol of an infrared data association (IrDA) I/F, a generic object exchange profile (GOEP) of a Bluetooth I/F, a basic imaging profile (BIP) of the Bluetooth I/F, a basic printing profile (BPP) of the Bluetooth I/F, and so forth have been used.

Examples of data received by the printing apparatuses using various types of protocols of the I/Fs include image data, and data in a specific format such as vCard or vCalender. Additionally, printing apparatuses have appeared, which can receive and print data in extensible hypertext markup language (XHTML)-print format capable of handing document data and image data at the same time using the BPP of the Bluetooth I/F. Printing apparatuses have supported a plurality of communication protocols and data formats.

For such printing apparatuses supporting a plurality of communication protocols, there are the following technologies.

In Japanese Patent Laid-Open No. 10-304007, a printer is disclosed, in which a plurality of types of protocols of devices can be switched in correspondence with hosts via a serial bus. A technology associated with the printer is disclosed, in which, first, the printer performs an initialization protocol that is not related to the types of protocols, and in which, then, the printer switches from the initialization protocol to a printer-specific protocol.

In Japanese Patent Laid-Open No. 2002-036668, a printing apparatus is disclosed, in which two types of I/Fs, such as an IEEE 1284 I/F and a USB I/F, are mounted. It is disclosed that the printing apparatus can selectively use any one of the two types of I/Fs.

In a case in which data is printed using a connection established between a personal computer (PC) and a printing apparatus as in the related art, for example, print settings, such as a sheet type, a print quality, a sheet size, a sheet orientation, and layout printing or duplex printing, need to be determined. When data is printed, the print settings can be set using a setting user interface of a printer driver on a display of the PC.

However, from among communication protocols used to print data, there are some types of communication protocols in which a function of sending image data is defined, and in which no function of sending print-setting information is defined. More specifically, when image data is sent from an image-supplying apparatus, such as a digital camera or a mobile phone, directly to a printing apparatus to print the image data instead of using a PC, there are some cases in which image data is sent using a communication protocol in which a function of sending print-setting information is not defined. Accordingly, when the communication protocol is used, it is not possible to print the image data using print settings that are set in the image-supplying apparatus.

In this case, the user can input the print settings in the printing apparatus in advance before the printing apparatus receives the image data, the printing apparatus prints the received image data using the print settings, whereby the received image data can be printed using the print settings specified by the user.

However, in this manner, after the image data to be printed is sent from the image-supplying apparatus to the printing apparatus, it is not possible to input the print settings. For this reason, when the image data is printed and the user looks at the print result, the user recognizes that the print settings are not desired print settings in some cases.

SUMMARY OF THE INVENTION

The present invention provides a print-control apparatus that can solve all of or at least one of the above-described problems.

According to an aspect of the present invention, there is provided a print-control apparatus supporting a plurality of communication methods. The print-control apparatus includes the following elements: a communication unit configured to communicate with an image-supplying apparatus and to receive image data from the image-supplying apparatus; a determination unit configured to determine whether a communication method used to communicate with the image-supplying apparatus is a predetermined communication method; a display unit configured to display a print-setting screen used to set a print setting; and a control unit configured to, in a case in which it is determined by the determination unit that the communication method used to communicate with the image-supplying apparatus is the predetermined communication method, start a process of printing the image data in response to reception of the image data, the image data being received by the communication unit, and, in a case in which it is determined by the determination unit that the communication method used to communicate with the image-supplying apparatus is not the predetermined communication method, allow the display unit to display the print-setting screen prior to performance of a process of printing the image data received.

Further features of the present invention will become apparent from the following description of exemplary embodiments with reference to the attached drawings.

BRIEF DESCRIPTION OF THE DRAWINGS

FIG. 5 is an illustration showing an example of a displayed screen for changing print settings of the present invention.

FIG. 6 is an illustration showing an example of the displayed screen for changing print settings.

FIG. 7 is an illustration showing an example of a management table of the present invention.

FIG. 8 is an illustration showing an example of print-setting information received by the printing apparatus of FIG. 1.

FIG. 9 is an illustration showing an example of the print-setting information received by the printing apparatus of FIG. 1.

DESCRIPTION OF THE EMBODIMENTS

Various embodiments of the present invention are described in detail below in conjunction with the accompanying drawings.

First Embodiment

Figure 2:
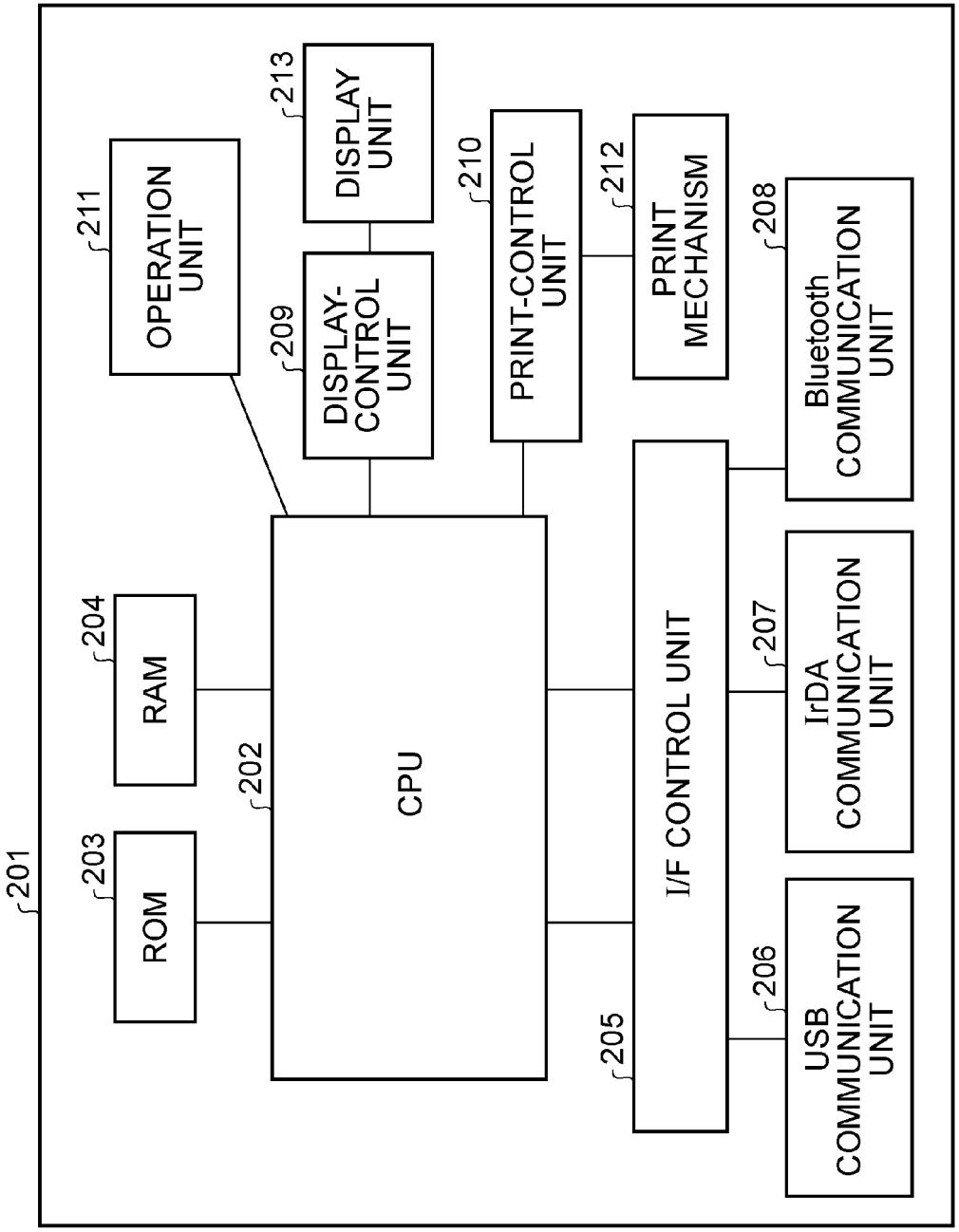
FIG. 2 is a block diagram of a configuration of the printing apparatus of FIG. 1.

FIG. 2 is a block diagram of a hardware configuration of a printing apparatus according to a first embodiment of the present invention. As shown in FIG. 2, a printing apparatus 201 includes a central processing unit (CPU) 202, a read-only memory (ROM) 203, a random-access memory (RAM) 204, an I/F control unit 205, a USB communication unit 206, an IrDA communication unit 207, a Bluetooth communication unit 208, a display-control unit 209, an operation unit 211, and a print-control unit 210.

The CPU 202 provides overall control of the printing apparatus 201. The CPU 202 controls each unit of the printing apparatus 201. The ROM 203 is a non-volatile memory, and, in the ROM 203, a management table for suspending printing processes, a parameter necessary for a printing process, which are described below, and so forth are recorded. A program is also recorded in the ROM 203, and the CPU 202 controls arithmetic processing and each unit on the basis of the program read from the ROM 203. The RAM 204 is a volatile memory, and, in the RAM 204, data necessary for a data process or arithmetic processing is temporarily recorded. Additionally, the RAM 204 is used as a workspace.

The display-control unit 209 controls a display unit 213 so that an image or a print-setting screen can be displayed on the display unit 213 that is provided on the printing apparatus 201. The operation unit 211 detects that an operation member (not shown) provided in the printing apparatus 201 is operated. The operation unit 211 also notifies the CPU 202 of the operations performed by the operation member. When the CPU 202 receives the notification from the operation unit 211, the CPU 202 performs a process corresponding to each of the operations. The print-control unit 210 controls a print mechanism 212 so that the print mechanism 212 can print an image on printing paper. As the print mechanism 212, an ink-jet-type print mechanism may be used, for example. Alternatively, a print mechanism of any printing type, such as a thermal-dye-sublimation type, a thermo-sensitive type, or an electro-photographic type, may be used.

The printing apparatus 201 according to the first embodiment can perform communication using a plurality of communication methods, and switches the communication methods in correspondence with image-supplying apparatuses connected to the printing apparatus 201. The USB communication unit 206 performs communication using a USB I/F. The IrDA communication unit 207 performs communication using an IrDA I/F. The Bluetooth communication unit 208 performs communication using a Bluetooth I/F. The I/F control unit 205 controls each of the USB communication unit 206, the IrDA communication unit 207, and the Bluetooth communication unit 208. The I/F control unit 205 determines which I/F is used to perform communication and sends and receives data in correspondence with each communication unit.

In a case in which data is sent and received, first, between the printing apparatus 201 and an image-supplying apparatus, a communication connection is established using the physical layer and the data-link layer in accordance with a method defined by the standard of each of the USB I/F, the IrDA I/F, and the Bluetooth I/F. Then, data is sent and received between the printing apparatus 201 and the image-supplying apparatus in accordance with protocols that are in the upper layers (in the network layer, the transport layer, the session layer, the presentation layer, and the application layer) that are defined by the standard of each of the I/Fs, or in accordance with other defined standards of the upper layers.

As described above, the printing apparatus according to the first embodiment supports various types of communication standards and protocols. Accordingly, the printing apparatus can establish communication connections with external apparatuses using a plurality of communication methods.

Figure 1:
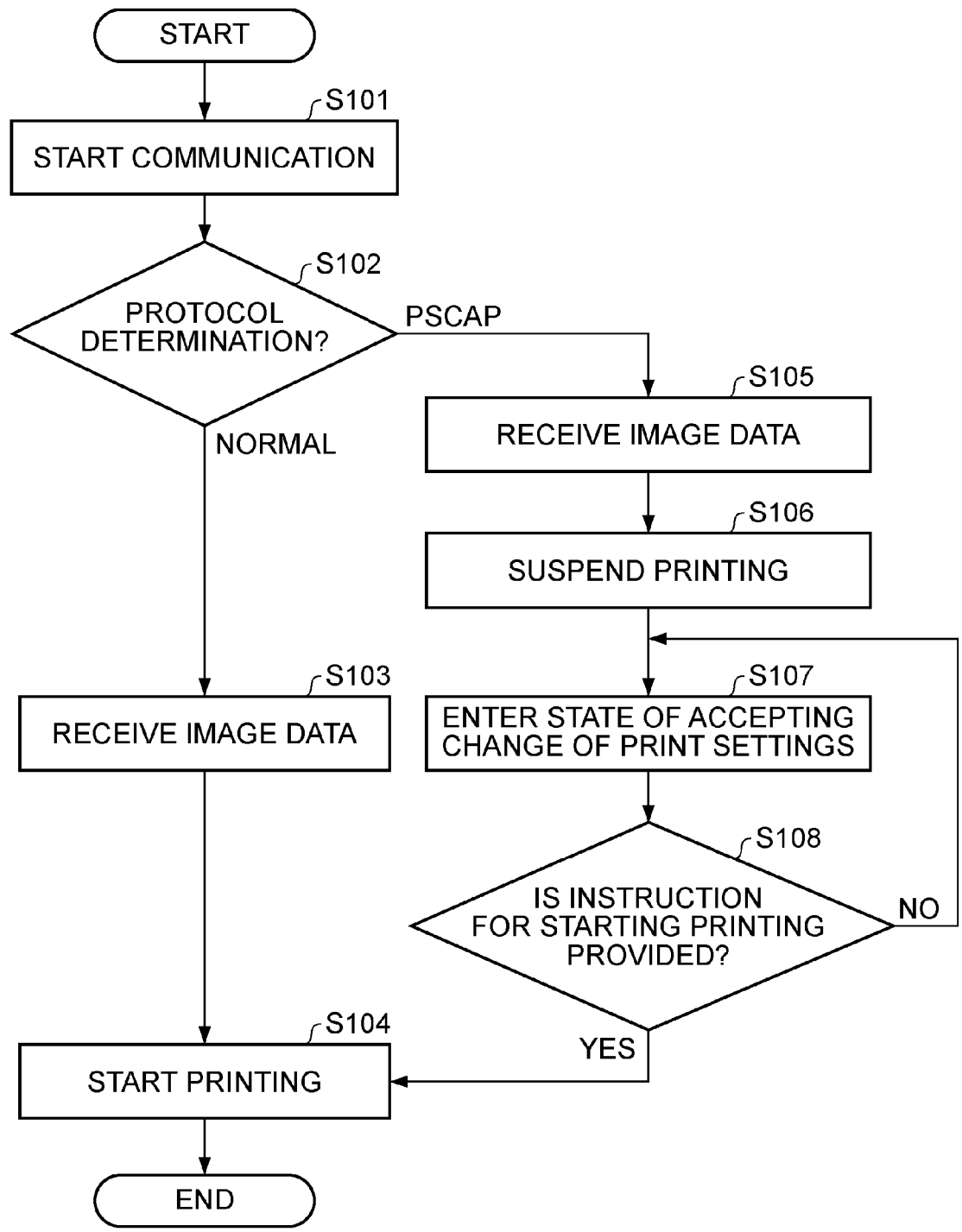
FIG. 1 is a flowchart of processes performed by a printing apparatus of the present invention.

FIG. 1 is a flowchart showing an outline of operations and processes performed by the printing apparatus according to the first embodiment. The operations and processes are performed on the basis of the program that the CPU 202 reads from the ROM 203.

The printing apparatus 201 starts communication with the image-supplying apparatus, such as a digital camera or a mobile phone, using the USB communication unit 206, the IrDA communication unit 207, or the Bluetooth communication unit 208 (step S101). When the communication is started, the type of communication protocol, indicating which communication method the printing apparatus 201 uses to currently have a communication connection with the image-supplying apparatus, is determined (step S102). On the basis of the result of the protocol determination of step S102, it is determined whether processes of steps S103 and S104 (a normal printing process) are to be performed or rather processes of steps S105 to S108 and the process of step S104 (a print-setting-change-accepting process) are to be performed, and thereby switching between the normal printing process and the print-setting-change-accepting process (PSCAP). In the protocol determination of step S102, whether the communication with the image-supplying apparatus has been established using a predetermined communication method is determined. A determination process of the protocol determination is described below in detail.

In the normal printing process, image data to be printed and information concerning print settings are received from the image-supplying apparatus that the printing apparatus 201 currently has a communication connection with, and the image data and the information are temporarily recorded in the RAM 204 (step S103). Then, the received image data is subjected to image processing or the like, and the print mechanism 212 is controlled so as to start printing of an image using the received print settings (step S104).

In the print-setting-change-accepting process, as in the case of step S103, image data is received from the image-supplying apparatus (step S105). However, printing is not automatically started immediately after the image data is received (step S106). In step S107, the printing apparatus enters a state of accepting change of print settings. When the image data is received, a print-setting screen is displayed on the display unit 213. Using the operation unit 211, a user can provide an instruction for changing print settings. If such an instruction is provided, then it is accepted. The printing apparatus remains in the state of accepting change of the print settings until an instruction for starting printing is input to the operation unit 211 (step S108). When the instruction for starting printing is input (YES in step S108), a printing process is started in step S104. In the print-setting-change-accepting process, if such an instruction for changing print settings has been provided, the image data is printed on the basis of the print settings that have been accepted in step S107. However, if the instruction for starting printing is input in step S108 without changing any printing setting in step S107, then the CPU 202 reads predetermined printing settings (or alternatively default printing settings) which are recorded in the ROM 203. Then, the print mechanism 212 prints an image using the printing settings that have been read by the CPU 202 from the ROM 203.

In this embodiment, after image data is received, a change of printing settings can be accepted in the printing apparatus. Accordingly, when a communication method in which how to send and receive printing settings is not specified is used, printing settings can be set in the printing apparatus after image data is sent.

Additionally, in this embodiment, on the basis of a communication method used between the image-supplying apparatus and the printing apparatus, it is determined whether a change of the printing settings is to be accepted. In other words, when a communication method in which how to receive printing settings is not defined is used, a change of printing settings can be accepted prior to performance of a printing process. Furthermore, when a communication method in which printing settings can be received is used, a printing process can be automatically started immediately after image data is received.

A protocol-determination process and an operation after performance of the protocol determination process in a case in which the printing apparatus 201 accepts establishment of a communication connection with the image-supplying apparatus are described in detail below with reference to a flowchart shown in FIG. 3.

The printing apparatus 201 accepts establishment of a communication connection with the image-supplying apparatus using the USB communication unit 206, the IrDA communication unit 207, or the Bluetooth communication unit 208 (step S301).

When a communication connection is established, it is determined whether the communication connection is a communication connection with the USB communication unit 206 (step S302). When the communication connection is a communication connection with the USB communication unit 206, next, it is determined whether an upper layer communication protocol which is in a layer above that of a USB I/F is a PictBridge protocol using the PTP of the USB I/F (step S303). When an upper layer protocol which is in a layer above that of the USB I/F is the PictBridge, the flow proceeds to a process following a symbol 1 shown in FIG. 4. When an upper layer protocol which is in a layer above that of the USB I/F is not the PictBridge, a normal data-receiving process and a normal printing process are performed using USB communication (step S314), and the processing of FIG. 3 ends.

When the communication connection established with the image-supplying apparatus is not a communication connection with the USB communication unit 206 (in step S302), next, it is determined whether the communication connection is a communication connection with the IrDA communication unit 207 (step S304). When the communication connection is a communication connection with the IrDA communication unit 207, next, it is determined whether an upper layer communication protocol which is in a layer above that of an IrDA I/F is an OBEX protocol (step S305). When an upper layer communication protocol which is in a layer above that of the IrDA I/F is the OBEX protocol, the flow proceeds to a process following a symbol 2 shown in FIG. 4. When an upper layer communication protocol which is in a layer above that of the IrDA I/F is not the OBEX protocol, a normal data-receiving process and a normal printing process are performed using IrDA communication (step S315), and the processing of FIG. 3 ends.

When the communication connection established with the image-supplying apparatus is not a communication connection with the IrDA communication unit 207 (in step S304), then, it is determined whether the communication connection is a communication connection with the Bluetooth communication unit 208 (step S306). When the communication connection is not a communication connection with the Bluetooth communication unit 208, then in this embodiment a system error has occurred, so the processing of FIG. 3 ends.

When the communication connection is a communication connection with the Bluetooth communication unit 208, next, it is determined whether an upper layer communication protocol which is in a layer above that of a Bluetooth I/F is a GOEP (step S307). When an upper communication protocol layer which is in a layer above that of the Bluetooth I/F is the GOEP, the flow proceeds to the process following the symbol 2 shown in FIG. 4. When an upper layer communication protocol which is in a layer above that of the Bluetooth I/F is not the GOEP, it is determined whether an upper layer communication protocol is a BIP (step S308). When an upper layer communication protocol is the BIP, then, it is determined whether the communication connection is a communication connection using an image push feature of the BIP (step S309). When the communication connection is a communication connection using the image push feature, the flow proceeds to the process following the symbol 2 shown in FIG. 4. When the communication connection is not a communication connection using the image push feature, it is further determined whether the communication connection is a communication connection using an advanced image printing feature of the BIP (step S310). When the communication connection is a communication connection using the advanced image printing feature, the flow proceeds to the process following the symbol 1 shown in FIG. 4. When the communication connection is not a communication connection using the image push feature or the advanced image printing feature, a normal data-receiving process and a normal printing process are performed using Bluetooth communication (step S316), and the processing of FIG. 3 ends.

In step S308, when an upper layer communication protocol is not the BIP, then, it is determined whether the communication protocol is a communication connection using a BPP (step S311). When the communication connection is a communication connection using the BPP, it is further determined whether the communication connection is a communication connection using a simple push model of the BPP (step S312). When the communication connection is a communication connection using the simple push model, the flow proceeds to the process following the symbol 2 shown in FIG. 4. When the communication connection is not a communication connection using the simple push model, then, it is determined whether the communication connection is a communication connection using a job based transfer model of the BPP (step S313). When the communication connection is a communication connection using the job based transfer model, the flow proceeds to the process following the symbol 1 shown in FIG. 4. When the communication connection is not a communication connection using the simple push model or the job based transfer model, a normal data-receiving process and a normal printing process are performed using the Bluetooth communication (step S316), and the processing of FIG. 3 ends.

Figure 3:
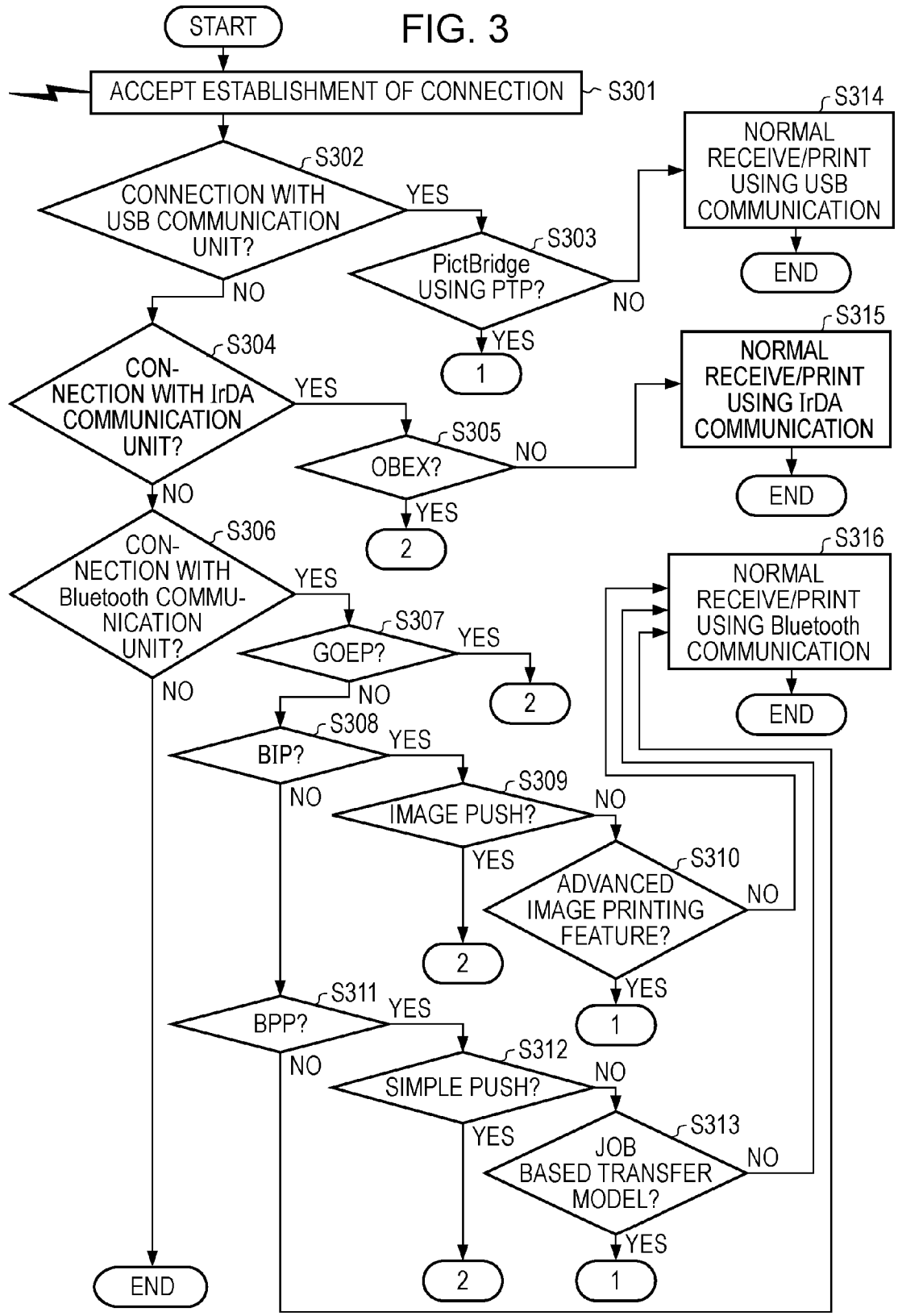
FIG. 3 is a flowchart of processes performed by the printing apparatus of FIG. 1.

Furthermore, when it is determined that the communication connection is a communication connection with the Bluetooth communication unit 208 (in step S306), but an upper layer communication protocol is not the GOEP, the BIP, or the BPP, then a normal data-receiving process and a normal printing process are performed using the Bluetooth communication (step S316), and the processing of FIG. 3 ends.

The process following the symbol 2 is a process used for a protocol in which a function of sending print-setting information from an image-supplying apparatus to a printing apparatus is not defined. As examples of such a protocol, the OBEX protocol of the IrDA I/F, the GOEP of the Bluetooth I/F, the image push feature of the BIP of the Bluetooth I/F, and the simple push model of the BPP of the Bluetooth I/F are described. Accordingly, as described above, when such a protocol is used, the flow proceeds to the process following the symbol 2 shown in FIG. 4.

In contrast, the process following the symbol 1 is a process used for a protocol in which the function of sending print-setting information from an image-supplying apparatus to a printing apparatus is defined. As examples of such a protocol, the PictBridge using the PTP of the USB I/F, the advanced image printing feature of the BIP of the Bluetooth I/F, and the job based transfer model of the BPP of the Bluetooth I/F are described. Accordingly, as described above, when such a protocol is used, the flow proceeds to the process following the symbol 1 shown in FIG. 4.

Operations of the printing apparatus 201 after the protocol determination process is performed as shown in FIG. 3 are described in detail with reference to a flowchart shown in FIG. 4.

As described above, when a protocol in which the function of sending print-setting information from an image-supplying apparatus to a printing apparatus is defined is used, the process following the symbol 1 is performed. More specifically, when the printing apparatus 201 accepts establishment of a communication connection with the image-supplying apparatus, the printing apparatus 201 waits for receiving of print-setting information (step S401). The printing apparatus 201 next determines whether print-setting information is received (step S402). When print-setting information is received (in step S402), the printing apparatus 201 receives image data (step S403), and performs a process of printing the image data using the print-setting information that has already been received (step S404), and the processing of FIG. 4 ends. When no print-setting information is received (in step S402), the flow proceeds to the process following the symbol 2.

As described above, when a protocol in which the function of sending print-setting information from an image-supplying apparatus to a printing apparatus is not defined is used or when no print-setting information is received (step S402), the process following the symbol 2 is performed. In such a case, although image data is received (step S405), the flow does not proceed immediately to a process of performing a printing process; instead, the flow proceeds to a process of suspending a printing process (step S406). In order to report the suspension of a printing process to the user, the printing apparatus 201 allows a light-emitting diode (LED) provided on the printing apparatus 201 or the like to blink (step S407). At the same time, in order that the display-control unit 209 accepts a change of printing settings and the instruction for starting printing, which are provided by the user, the display-control unit 209 displays a screen for changing the print settings on the display unit 213 (step S408). Examples of the screen for changing the print settings are shown in FIGS. 5 and 6. With the display of the screen, an input of print settings and the instruction for starting printing are accepted using the operation unit 211. When the screen for changing the print settings is displayed, the current print settings may be displayed as initialization values. By displaying the current print settings, after image data is sent from the image-supplying apparatus, the user can check the current print settings on the display unit 213 of the printing apparatus 201.

Figure 4:
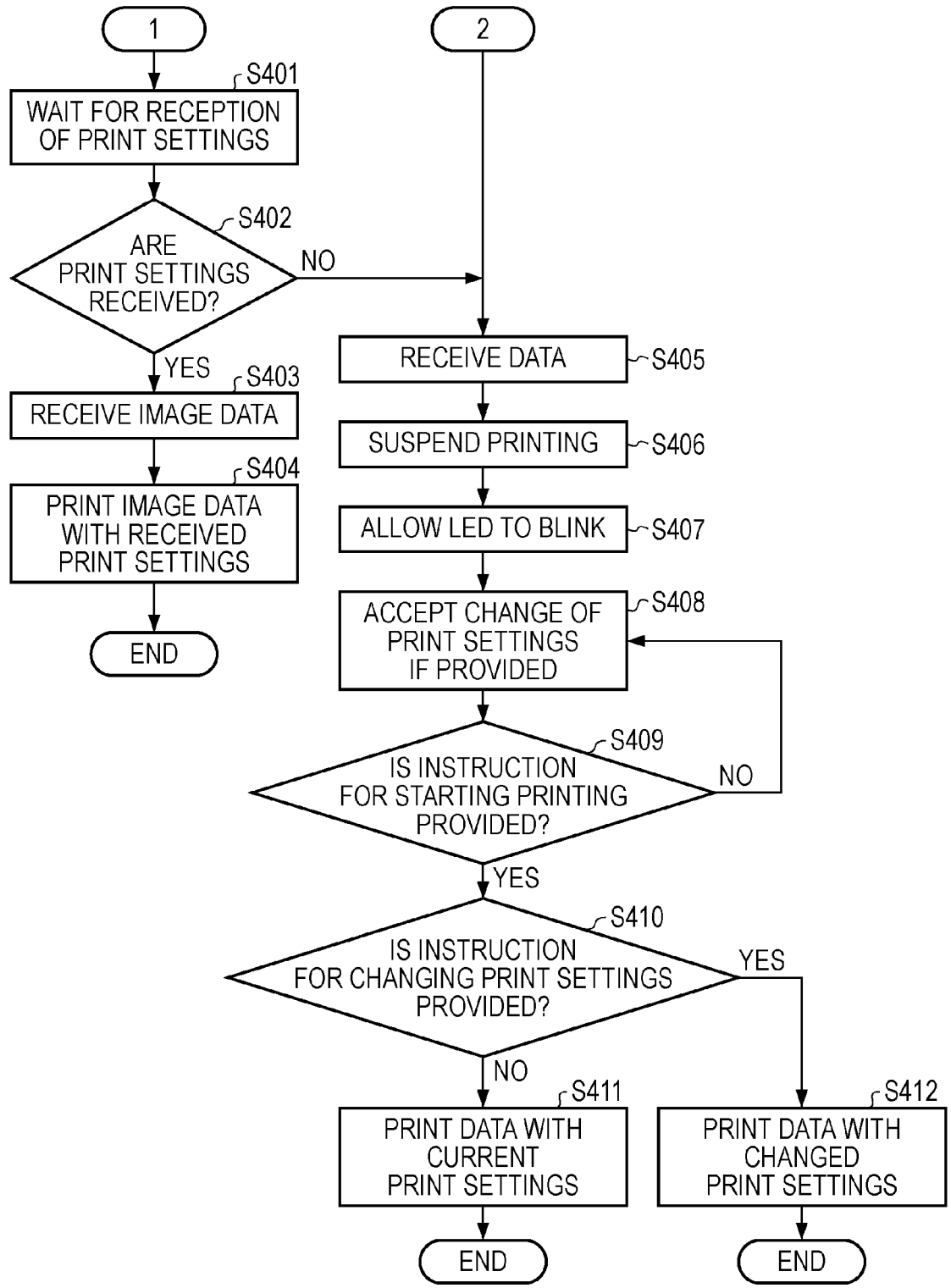
FIG. 4 is a flowchart of processes performed by the printing apparatus of FIG. 1.

Next, with reference to the flowchart shown in FIG. 4, until the instruction for starting printing provided by the user is accepted (step S409), the performance of a printing process is not started, and a process of accepting a change of the print settings is performed. However, even when no instruction for starting printing is accepted, for example if the user declines to provide such instruction, the flow may be designed so that a timeout can occur when a certain time is reached, and so that the flow can proceed to the next process.

When the instruction for starting printing is provided, it is determined whether an instruction for changing the print settings is provided by the user (step S410). When no instruction for changing the print settings is provided, a process of printing the received image data is performed using the current print settings that are set in the printing apparatus 201 or using the default print settings if no current print setting is set (step S411), and the processing of FIG. 4 ends. When the instruction for changing the print settings is provided, a process of printing the received image data is performed using the accepted changed print settings (step S412), and the processing of FIG. 4 ends. In this embodiment, the print settings that have been accepted are discarded every time a printing process is performed. However, the printing settings that have been accepted can alternatively be saved as the current print settings in the printing apparatus 201.

In this embodiment, a process of receiving image data is performed in step S405. However, before the flow proceeds to the next process, the flow does not necessarily wait until all of the image data is received. The image data may be received while a process of a step following step S405 is concurrently performed.

Next, examples of the screen for changing the print settings that is displayed on the display unit 213 in step S408 are described with reference to FIGS. 5 and 6.

In the foregoing description, the printing apparatus receives image data. The printing apparatus can receive and print not only image data but also document data. Additionally, on the basis of the type of received print data, settable items may be determined, and a print-setting screen may be displayed. In this case, only print-setting items related to printing of the received print data may be used as the settable items, and only necessary items may be displayed, thereby improving the operability.

When the data received by the printing apparatus 201 is image data written in a file, such as a JPG format file as shown in FIG. 5, first, the current print settings for an image that are currently set in the printing apparatus 201 are displayed. Each setting item can be changed using the operation unit 211. For example, when the sheet size of sheets supplied in the printing apparatus 201 is L size, a setting that is set for the item of sheet size can be changed. In other words, the setting can be reset from A4 to L sheet size. Additionally, when the printing apparatus has a function of detecting a sheet size, the printing apparatus can be configured so that a detected sheet size can automatically affect a print setting.

When the data received by the printing apparatus 201 is document data written in a file such as a vCard format file shown in FIG. 6, first, the current print settings for a document that are currently set in the printing apparatus 201 are displayed. For example, when it is desired to select a larger font for a document to be printed, a setting that is set for the item of font size can be changed. For example, the setting can be reset to 14 pt or the like.

When the change of the print settings is finished, the instruction for starting printing is provided by selecting OK. When CANCEL is selected, the print settings that have been changed are discarded, and the current print settings that were set before the screen for changing the print settings is displayed are retrieved and displayed. In this manner, the user can set print settings suitable for the received print data, and can print the received print data.

Regarding the process following the symbol 1 shown in FIG. 4, an example is described below with reference to FIGS. 8 and 9, in which no print-setting is received using a protocol in which the function of sending print-setting information from an image-supplying apparatus to a printing apparatus is defined. FIGS. 8 and 9 show examples of print-setting information using the job based transfer model of the BPP. The printing apparatus 201 receives the print-setting information shown in FIGS. 8 and 9 from the image-supplying apparatus. In the example shown in FIG. 8, the number of copies, items associated with a printing sheet, a printing quality, and so forth that are described in a region defined by a closing line are specified as print settings in the print-setting information. In contrast, in the example shown in FIG. 9, no information concerning print settings is provided in the print-setting information. In other words, no print setting is specified. Accordingly, when the print-setting information such as the example shown in FIG. 9 is received, in step S402 shown in FIG. 4, it is determined that no print setting is received and processing continues at step S405.

In the forgoing embodiment, whether the determined protocol is a protocol that needs the suspension of a printing process is determined using the processes of the flowchart shown in FIG. 3. However, whether the determined protocol is a protocol that needs the suspension of a printing process may be determined with reference to a predetermined table. An outline of a process performed in such a case is described below with reference to FIG. 7.

The printing apparatus 201 has a predetermined management table in the ROM 203. In the management table, for each protocol of each communication I/F, for a case in which print settings are received from the image-supplying apparatus and for a case in which print settings are not received from the image-supplying apparatus, whether a printing process is to be suspended is determined. The CPU 202 refers to the management table shown in FIG. 7 on the basis of the determined protocol and on a basis of whether printing settings are received after the protocol determination. On the basis of the result of the reference, when it is determined that a printing process is to be suspended, the process following the symbol 2 shown in FIG. 4 is performed. When it is determined that a printing process is not to be suspended, a normal data-receiving process and a normal printing process are performed.

The management table shown in FIG. 7 may be designed so that each of determination criteria (YES and NO) in the management table can be changed by an instruction provided by the user. For example, suppose that the user always uses a printing process using the OBEX protocol of the IrDA I/F, and that the frequency of suspension of printing processes is low, for example, because print settings are not changed so often. In such a case, the management table may be designed so that the determination criteria in the management table can be changed by an instruction provided by the user.

Additionally, in the first embodiment, some protocols are described, in which it is not known whether the function of sending print-setting information from an image-supplying apparatus to a printing apparatus is defined. When any of the protocols is used, a printing process is not suspended. Rather, a normal print-data-receiving process and a normal printing process are performed. However, there is a high probability that, in the protocols, the function of sending print-setting information from an image-supplying apparatus to a printing apparatus is not defined. For this reason, instead of performing a normal printing process, a printing process may be suspended, and a change of printing settings may be accepted.

Furthermore, in the first embodiment, whether a change of printing settings is to be accepted is determined in accordance with the type of protocol which is in a layer above that of an I/F. However, whether a change of printing settings is to be accepted may be determined in accordance with the type of I/F having a hierarchical structure.

For example, suppose that the printing apparatus 201 supports I/Fs including the IrDA I/F, and that, as the protocol of the IrDA I/F, the printing apparatus 201 supports only a protocol in which the function of sending print-setting information from an image-supplying apparatus to a printing apparatus is not defined. In such a case, when it is determined that the IrDA I/F is being used, it is clear that no print-setting information is sent from the image-supplying apparatus to the printing apparatus 201. Accordingly, when it is determined that the IrDA I/F is being used, a printing process may be suspended, and a change of print settings may be accepted.

As described above, according to the first embodiment, after the printing apparatus receives print data from the image-supplying apparatus, instead of immediately starting a printing process based on the print data, the printing process can be suspended. If the printing process is suspended, a change of print settings can be accepted in the printing apparatus.

Moreover, in the first embodiment, the printing apparatus determines whether print settings are set in the image-supplying apparatus. This determination is made on the basis of the communication protocol determination or on the basis of whether the print-setting information is received. On the basis of the determination result, whether the print-setting screen is to be displayed and a change of print settings is to be accepted is determined instead of immediately starting a printing process in response to reception of print data. Accordingly, only when it is determined that a change of print settings in the printing apparatus is necessary, a printing process is suspended. When it is determined that no change of print settings is necessary, the printing process can be started immediately after print data is received.

OTHER EMBODIMENTS

The present invention is not limited to the first embodiment described above. Various modifications thereof may be made without departing from the scope of the present invention, and moreover the present invention may be implemented in a wide variety of additional manners.

For example, in the first embodiment, for each protocol used in each of the USB I/F, the IrDA I/F, and the Bluetooth I/F, it is determined whether a printing process is to be suspended. However, the present invention is not limited to any particular communication I/Fs or protocols described above with respect to the first embodiment. Rather, any of a wide variety of communication I/Fs and protocols may alternatively be used.

Additionally, in other embodiments of the present invention, a program of software that implements processes or other features according to a forgoing embodiment may be supplied directly from a recording medium or using wired/wireless communication to a system or an apparatus having a computer capable of executing the program, and the program of software can then be executed by the computer.

Accordingly, the present invention includes program code that is supplied to and installed in a computer so that the computer implements processes and/or features of the present invention. In another embodiment of the present invention, a software program for implementing features of the present invention is stored in a computer readable medium. A computer accesses the medium and executes the stored software program to implement processes and/or other features according to the present invention.

The form of program is not limited. For example, the program may include object code, program code designed for execution by an interpreter, script data supplied to an operating system (OS), or the like.

Examples of the recording medium that supplies the program include a flexible disk, a hard disk, a magnetic recording medium such as a magnetic tape, a magneto-optical disk (MO), a compact disk read-only memory (CD-ROM), a compact disk recordable (CD-R), a compact disk rewritable (CD-RW), a digital-versatile disk read-only memory (DVD-ROM), a digital-versatile disk recordable (DVD-R), and a digital-versatile disk rewritable (DVD-RW). Furthermore, an optical/magneto-optical storage medium, or a non-volatile semiconductor memory may be used. Any computer-readable storage medium can be used.

Examples of a method for supplying the program using wired/wireless communication include a method in which a computer program that implements processes or other features according to the embodiment of the present invention is stored in a server in a computer network and a method in which program-data is saved in the server and downloaded into a client computer that has a connection with the computer network.

For example, the program-data may include a file having a function of decompressing and automatically installing the computer program that implements processes or features of the present invention.

In this case, the program-data can be divided into a plurality of segment files, and the segment files can be disposed in different servers.

In other words, in another embodiment of the present invention, a server apparatus that allows a plurality of users to download program-data that enables a computer to implement processes or other features of the present invention is provided.

While the present invention has been described with reference to various exemplary embodiments, it is to be understood that the invention is not limited to the disclosed exemplary embodiments. For example, all modifications and equivalent structures and functions of the various described embodiments are likewise encompassed by the present invention. The scope of the following claims is to be accorded the broadest interpretation.

This application claims the benefit of Japanese Patent Application No. 2007-156393 filed Jun. 13, 2007, which is hereby incorporated by reference herein in its entirety.

What is claimed is:

1. A print-control apparatus supporting a plurality of communication methods, the print-control apparatus comprising:
 a communication unit configured to communicate with an image-supplying apparatus and to receive image data from the image-supplying apparatus;
 a determination unit configured to determine whether a communication method used to communicate with the image-supplying apparatus is a predetermined communication method;
 a display control unit configured to perform control, in a case in which it is determined by the determination unit that the communication method used to communicate with the image-supplying apparatus is not the predetermined communication method, to allow a display unit to display a print-setting screen for setting a print setting in response to reception of the image data by the communication unit; and
 a print control unit configured to perform control, in a case in which it is determined by the determination unit that the communication method used to communicate with the image-supplying apparatus is the predetermined communication method, to start a process of printing the image data in response to the reception of the image data by the communication unit, and in a case in which it is determined by the determination unit that the communication method used to communicate with the image-supplying apparatus is not the predetermined communication method, not to start the process of printing the image data in response to the reception of the image data by the communication unit and to start the process of printing the image data after the print setting is set on the print-setting screen,
 wherein the print control unit starts the process of printing the received image data even if not receiving an instruction for starting printing in a case in which a predetermined time has passed without the print setting being set on the print-setting screen.

2. The print-control apparatus according to claim 1 further comprising an operation unit, wherein, when the print-setting screen is being displayed, the print control unit starts the process of printing the image data in response to provision by the operation unit of an instruction for starting printing.

3. The print-control apparatus according to claim 1, wherein the print control unit performs the process of printing the image data using the print setting that is set on the print-setting screen.

4. The print-control apparatus according to claim 1, wherein, on the print-setting screen, a print-setting item associated with printing of the image data received is settable.

5. The print-control apparatus according to claim 1, wherein the plurality of communication methods includes at least any one of a using an infrared data association interface, using a Bluetooth interface, and using a universal serial bus interface.

6. The print-control apparatus according to claim 1, wherein, once it is determined by the determination unit that the communication method used to communicate with the image-supplying apparatus uses an infrared data association interface, the display control unit allows the display unit to display the print-setting screen.

7. The print-control apparatus according to claim 1, wherein, once it is determined by the determination unit that the communication method used to communicate with the image-supplying apparatus uses an object exchange protocol of an infrared data association interface, the display control unit allows the display unit to display the print-setting screen.

8. The print-control apparatus according to claim 1, wherein the predetermined communication method includes at least any one of using a generic object exchange profile of a Bluetooth interface, using an image push feature of a basic imaging profile of the Bluetooth interface, and using a simple push model of a basic printing profile of the Bluetooth interface.

9. The print-control apparatus according to claim 1, wherein the print control unit starts the process of printing the image data in response to finishing of setting of the print setting on the print-setting screen.

10. The print-control apparatus according to claim 1, wherein, in a case in which the predetermined time has passed without input of an instruction to change the print setting on the print-setting screen, the print control unit performs control to perform the process of printing the image data received by the communication unit based on the print setting currently set on the print-control apparatus.

11. The print-control apparatus according to claim 1, wherein, in a case in which the predetermined time has passed without input of an instruction to change the print setting on the print-setting screen, the print control unit performs control to perform the process of printing the image data received by the communication unit based on a default print setting set on the print-control apparatus.

12. A print-control method comprising:
communicating with an image-supplying apparatus and receiving image data from the image-supplying apparatus;
determining whether a communication method used to communicate with the image-supplying apparatus is a predetermined communication method; and
in a case in which it is determined that the communication method used to communicate with the image-supplying apparatus is not the predetermined communication method, allowing a display unit to display a print-setting screen for setting a print setting in response to receiving the image data; and
in a case in which it is determined that the communication method used to communicate with the image-supplying apparatus is the predetermined communication method, starting a process of printing the image data in response to the reception of the image data by the communicating, and in a case in which it is determined by the determining that the communication method used to communicate with the image-supplying apparatus is not the predetermined communication method, not starting the process of printing the image data in response to the reception of the image data by the communicating and starting the process of printing the image data after the print setting is set on the print-setting screen,
wherein the process of printing the received image data is started even if not receiving an instruction for starting printing in a case in which a predetermined time has passed without the print setting being set on the print-setting screen.

13. The print-control method according to claim 12, wherein, when the print-setting screen is being displayed, the process of printing the image data is started in response to provision of an instruction for starting printing.

14. The print-control method according to claim 12, wherein, the process of printing the image data is performed using the print setting that is set on the print-setting screen.

15. The print-control method according to claim 12, wherein, on the print-setting screen, a print-setting item associated with printing of the image data received is settable.

16. The print-control method according to claim 12, wherein the print-control method supports a plurality of communication methods, and wherein the plurality of communication methods includes at least any one of using an infrared data association interface, using a Bluetooth interface, and using a universal serial bus interface.

17. The print-control method according to claim 12, wherein, once it is determined that the communication method used to communicate with the image-supplying apparatus uses an infrared data association interface, the print-setting screen is displayed.

18. The print-control method according to claim 12, wherein, once it is determined that the communication method used to communicate with the image-supplying apparatus uses an object exchange protocol of an infrared data association interface, the print-setting screen is displayed.

19. The print-control method according to claim 12, wherein the predetermined communication method includes at least any one of using a generic object exchange profile of a Bluetooth interface, using an image push feature of a basic imaging profile of the Bluetooth interface, and using a simple push model of a basic printing profile of the Bluetooth interface.

20. The print-control method according to claim 12, wherein, the process of printing the image data is started in response to finishing of setting of the print setting on the print-setting screen.

21. A non-transitory computer-readable storage medium in which a program that causes a computer to perform a print-control method is stored, the print-control method comprising:
communicating with an image-supplying apparatus and receiving image data from the image-supplying apparatus;
determining whether a communication method used to communicate with the image-supplying apparatus is a predetermined communication method; and
in a case in which it is determined that the communication method used to communicate with the image-supplying apparatus is not the predetermined communication method, allowing a display unit to display a print-setting screen for setting a print setting in response to receiving the image data; and
in a case in which it is determined that the communication method used to communicate with the image-supplying apparatus is the predetermined communication method, starting a process of printing the image data in response to the reception of the image data by the communicating, and in a case in which it is determined by the determining that the communication method used to communicate with the image-supplying apparatus is not the predetermined communication method, not starting the process of printing the image data in response to the reception of the image data by the communicating and starting the process of printing the image data after the print setting is set on the print-setting screen,
wherein the process of printing the received image data is started even if not receiving an instruction for starting printing in a case in which a predetermined time has passed without the print setting being set on the print-setting screen.

* * * * *